A. WEILL.
APPARATUS FOR MOLDING AUTOMATICALLY CERAMIC TILES WITH FLANGED EDGES FOR EMBEDMENT IN PLASTER.
APPLICATION FILED MAY 5, 1910.
1,005,383.
Patented Oct. 10, 1911.
2 SHEETS—SHEET 1.
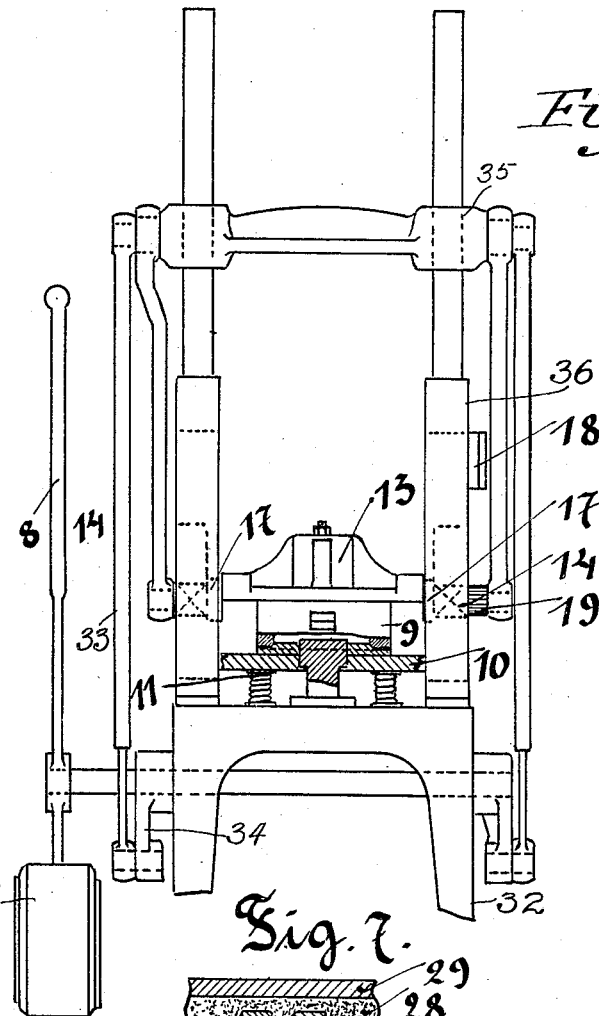
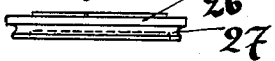
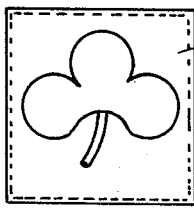
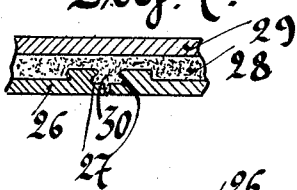
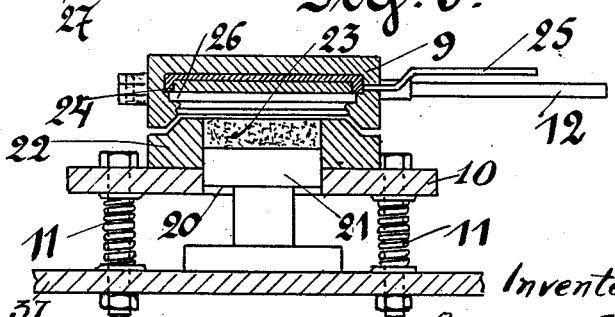
Witnesses:
Conrad Stallman,
Howard Leonard
Inventor,
André Weill,
by B. Singer Atty A. WEILL.
APPARATUS FOR MOLDING AUTOMATICALLY CERAMIC TILES WITH FLANGED EDGES FOR EMBEDMENT IN PLASTER.
APPLICATION FILED MAY 5, 1910.
1,005,383.
Patented Oct. 10, 1911.
2 SHEETS—SHEET 2.
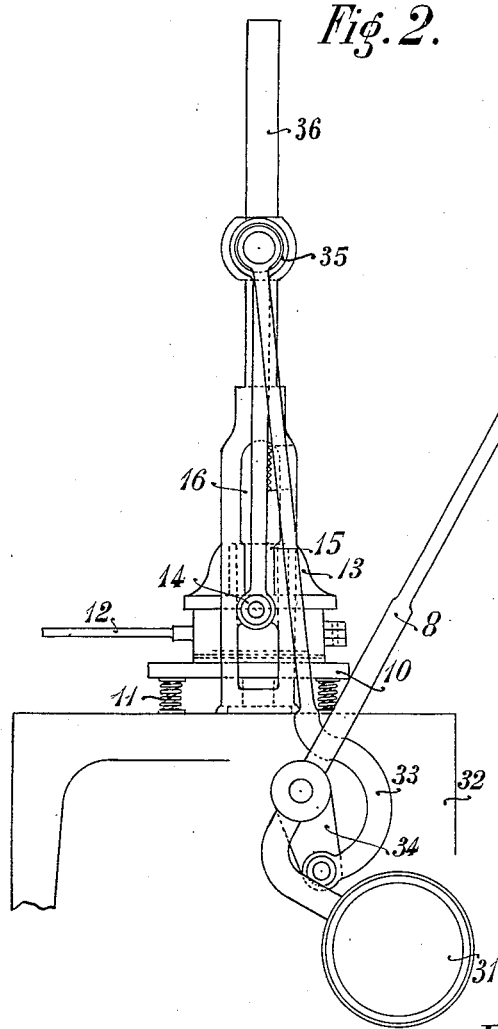
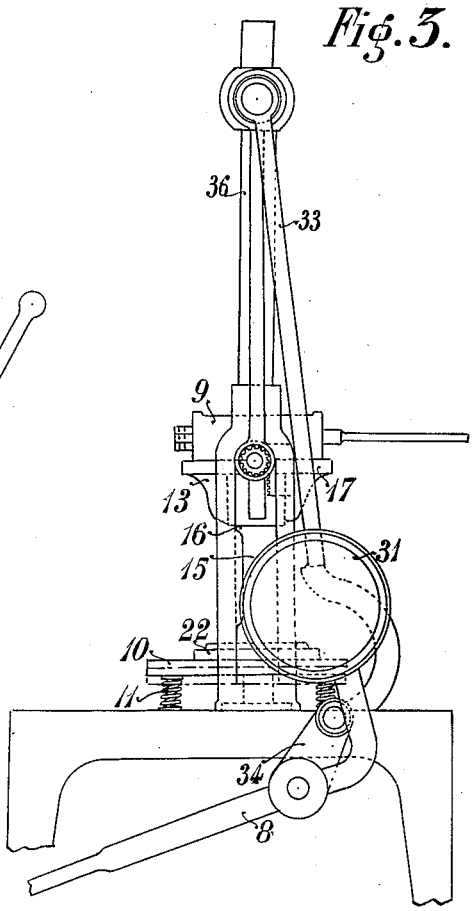
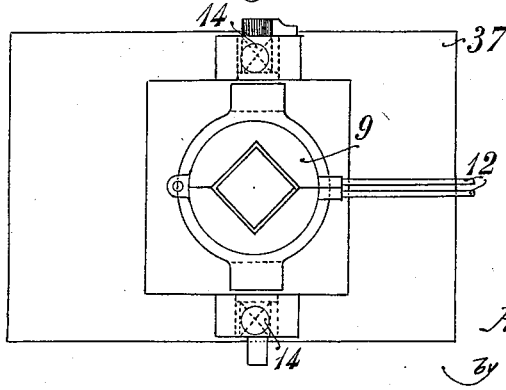
Witnesses
F. Stapel
A. Boese
Inventor
Andre Weill
by JB. Singer
Attys

UNITED STATES PATENT OFFICE.

ANDRÉ WEILL, OF BRUSSELS, BELGIUM.

APPARATUS FOR MOLDING AUTOMATICALLY CERAMIC TILES WITH FLANGED EDGES FOR EMBEDMENT IN PLASTER.

1,005,383.  Specification of Letters Patent.  Patented Oct. 10, 1911.

Application filed May 5, 1910. Serial No. 559,464.

*To all whom it may concern:*

Be it known that I, ANDRÉ WEILL, 4 Rue de Loxum, Brussels, in the Kingdom of Belgium, have invented new and useful Improvements in Apparatus for Molding Automatically Ceramic Tiles with Flanged Edges for Embedment in Plaster, of which the following is a specification.

This invention relates to an apparatus for molding tiles.

An object of the invention is to provide an apparatus in which the tiles may be manufactured so that there is no bur on the front surface thereof.

Another object of the invention is to provide an apparatus in which a mold may be pressed against a plastic mass so that the plastic mass is transferred into the mold.

Another object of the invention is to provide an apparatus in which great pressure may be exerted at that instant where the mold and the container of the plastic mass are in engagement with each other.

Another object of the invention is to provide an apparatus in which the mold is safely guided in its reciprocating movement toward and from the container of the plastic mass.

Another object of the invention is to rotate the mold at a given point of its travel so that the tile pressed into the same may be removed therefrom after opening of the mold.

With these and other objects in view I have illustrated by way of example one embodiment of this invention in the accompanying drawings.

Figure 1 is a front elevation of the press, the mold being shown in engagement with the container of the plastic mass, and certain parts being shown in section. Fig. 2 is a side elevation of the apparatus showing the device in operative position. Fig. 3 is a side elevation showing the mold removed from the container for the plastic mass. Fig. 4 is a plan top view of the mold. Fig. 5 illustrates a finished tile in side elevation and plan view. Fig. 6 is a section through the mold and through the container of the plastic mass. Fig. 7 is a sectional view showing the manner in which the tile is embedded in the plastic of the wall.

The actuating means of the apparatus which has the form of a press comprise a lever 8 provided with a counterweight 31. The lever is pivotally mounted on the frame 32 and it is rigidly connected with the link 33 by means of an arm 34. The other end of the link is in pivotal connection with a guiding element 35 which is adapted to reciprocate on an upright 36 extending from the frame of the machine. With the exception of the lever 8 and the counter-weight 31 the described parts are disposed in duplicate on both sides of the machine, as may be clearly seen from Fig. 1. A second link 36 extending downwardly from the guiding element 35 is pivotally connected at its lower end with the mold carrier 13. The mold carrier 13 is provided with guiding blocks 14 at both sides thereof, said blocks sliding in slots 15 which are provided in the uprights 36. From the above description it may be understood that a reciprocating movement is imparted to the mold carrier 13 when the actuating lever 8 is oscillated about its pivotal suspension.

The guiding slots 15 are enlarged at their upper end, as indicated at 16 and the mold carrier 13 is provided at both sides with rollers in juxtaposition to the guiding elements 14, said rollers being adapted to rotate within the enlarged portions 16 of the guiding slots. One of the uprights 36 carries a rack bar 18 disposed near the enlarged portion 16 of the groove. The rack bar engages a pinion 17 mounted on one side of the mold carrier 13 when that carrier approaches the upper end point of its travel. By this means the carrier is rotated at the upper end and the number of teeth in the pinion and rack bar produce a rotation of 180 degrees in said carrier.

The molding table comprises a base plate 37 on which is mounted a base plate 10 carrying a platen 22. The platen 22 is provided with an aperture in which the plastic mass 23 is received. This container of the plastic mass is supported on the base plate 37 resiliently by means of springs 11 which surround bolts extending from the base plate 37 to the plate 10. A plunger 21 is rigidly mounted on the base plate 37 and projects into the aperture 20 which serves for reception of the plastic mass.

The mold comprises a frame consisting of portions which are in pivotal connection with each other and a mold base 24 placed in said frame and provided with handles 25 by means of which the base may be removed from the mold frame after the same has been opened. In the embodiment shown in the drawing the tile manufactured in this apparatus is provided with an under cut portion on its circumference so that the projections are formed in the plaster in which the tile is embedded, said projections extending into the under cut portion of the tile.

In Figs. 5 and 7 the tile is indicated by 26 and the under-cut circumferential portion is indicated by reference letter 27. A mass of plaster 28 is spread evenly upon the wall 29 and the tile 26 is embedded in said plaster so that a projecting dove-tailed portion 30 is formed in the plaster between two adjacent tiles.

The operation of the device is as follows: When the mold carrier is in the position shown in Fig. 3 plastic mass 23 is inserted in the aperture formed in the container of the plastic mass on the platen 10. By oscillating the actuating lever 8 to the position shown in Fig. 2 the mold carrier 13 is turned so that the mold face is directed downwardly and at the same time the mold carrier with the mold is lowered until it engages the container 22 of the plastic mass. The oscillating movement of the lever 8 is continued so that the mold carrier and the mold presses the container against the action of the springs 11 downwardly. In this movement the plunger 21 projecting in the aperture 20 transfers the plastic mass from the stationary container into the mold so that the plastic mass fills all parts of the same. The lever 8 is then swung into the position shown in Fig. 3 and by this movement the mold carrier is elevated, and approaching the end point of its ascending movement the same is turned 180 degrees by the engagement of the rack bar 18 with the pinion 19 of the carrier. The plastic mass is retained within the mold by means of the projections formed in the mold, said projections producing the undercut circumferential portion 27 of the finished tile. When the mold carrier is in the position shown in Fig. 3 it is opened by means of the handle bars 12 and the mold base with the tile attached thereto may be removed from the mold frame, plastic mass may be poured into the container 22 and the entire operation is repeated.

It will be seen that in this operation the burs are not formed on that face of the tile which is directed outwardly after the tile is embedded in the plaster. In the presses for molding tiles which were known heretofore the face of the tile was formed so that burs were produced on the front part thereof and these burs had to be removed in a finishing process of the tile. On account of the heat generated by the pressure that part of the plastic mass which is next to the pressing surface will be the hottest part and it will be more fluid therefore than other portions of the mass. The finished tile will show all of the impressions in a more distinct way than it was known heretofore as the hottest part of the plastic mass is in engagement with the front face of the mold.

I claim:—

1. An apparatus for making tiles, comprising in combination a means for receiving plastic mass, resilient supports for said means, a movable mold, means for bringing said mold into engagement with said receiving means and a stationary element coacting with said receiving means for transferring said plastic mass from said receiving means to said mold.

2. An apparatus for making tiles, comprising in combination a platen provided with an aperture to receive plastic mass therein, resilient supports for said platen, a stationary plunger projecting into said aperture, a movable mold, and means for pressing said mold forcibly against said platen.

3. An apparatus for making tiles, comprising in combination a container for plastic mass, a mold, means for reciprocating said mold with respect to said container in vertical direction, stationary means for transferring the plastic mass from said container into the mold, and means for rotating the mold at the end of its vertical stroke.

4. An apparatus for making tiles, comprising in combination, a container for plastic mass, a mold, means for reciprocating said mold with respect to said container in vertical direction, means for pressing the plastic mass from said container into said mold at one end point of the stroke of the mold and means for rotating the mold at the other end point of the stroke of the same.

5. An apparatus for making tiles, comprising in combination, a frame, a container for plastic mass, a mold, means for reciprocating said mold with respect to said container in vertical direction, a mold carrier, means for transferring the plastic mass from said container into said mold, and means in coaction with said mold carrier and said frame for rotating the mold carrier at one end of its vertical stroke.

6. An apparatus for making tile, comprising in combination, a frame, a container for plastic mass, a mold, means for reciprocating the mold with respect to the container in vertical direction, a mold carrier, stationary means for automatically transferring the plastic mass from the container into said mold and means for automatically rotating said mold carrier at one end of its vertical stroke.

7. An apparatus for making tiles comprising in combination, a frame, a container for plastic mass, a mold, means for reciprocating the mold in vertical direction with respect to the container, a mold carrier, a gear wheel on said carrier, a stationary means in coaction with the container for transferring the mass therefrom into the mold, and a rack bar mounted on said frame and in periodical coaction with said gear wheel.

8. An apparatus for making tiles, comprising in combination, a frame having uprights, a container for plastic mass, a mold, means for reciprocating the mold vertically in the frame, a mold carrier, said uprights being provided with guiding slots having enlarged portions at one end thereof, guiding elements on said carrier in engagement in said slots, and means for turning said mold carrier when said guiding elements are in said enlarged portions.

In testimony whereof I affix my signature in presence of two witnesses.

ANDRÉ WEILL.

Witnesses:
 J. PEIRETTE,
 JOSEPH PEIRLAY.

Copies of this patent may be obtained for five cents each, by addressing the "Commissioner of Patents, Washington, D. C."